United States Patent
Kamijo

(10) Patent No.: US 7,725,831 B2
(45) Date of Patent: May 25, 2010

(54) COMMUNICATION DEVICE, COMMUNICATION SYSTEM, COMMUNICATION METHOD, PROGRAM AND RECORDING MEDIUM

(75) Inventor: Noboru Kamijo, Fujisawa (JP)

(73) Assignee: International Business Machines Corporation, Armonk, NY (US)

( * ) Notice: Subject to any disclaimer, the term of this patent is extended or adjusted under 35 U.S.C. 154(b) by 905 days.

(21) Appl. No.: 10/981,358

(22) Filed: Nov. 4, 2004

(65) Prior Publication Data

US 2005/0117066 A1 Jun. 2, 2005

(30) Foreign Application Priority Data

Nov. 27, 2003 (JP) ............................. 2003-397046

(51) Int. Cl.
- *G06F 15/177* (2006.01)
- *G06F 3/048* (2006.01)
- *G06F 3/033* (2006.01)
- *G06G 5/08* (2006.01)

(52) U.S. Cl. ....................... 715/734; 715/836; 715/849; 345/158

(58) Field of Classification Search ................. 709/203; 715/734–737, 853–854, 969; 345/158
See application file for complete search history.

(56) References Cited

U.S. PATENT DOCUMENTS

| | | | | |
|---|---|---|---|---|
| 5,554,980 A * | 9/1996 | Hashimoto et al. | ...... | 340/825.72 |
| 5,703,623 A * | 12/1997 | Hall et al. | ...... | 345/158 |
| 5,757,360 A * | 5/1998 | Nitta et al. | ...... | 345/156 |
| 6,069,594 A * | 5/2000 | Barnes et al. | ...... | 345/7 |
| 6,072,467 A * | 6/2000 | Walker | ...... | 345/157 |
| 6,204,844 B1 * | 3/2001 | Fumarolo et al. | ...... | 715/736 |
| 6,288,704 B1 * | 9/2001 | Flack et al. | ...... | 345/158 |

(Continued)

FOREIGN PATENT DOCUMENTS

JP  PUPA 11-258325  9/1999

(Continued)

OTHER PUBLICATIONS

D. Wormell and E. Foxlin, Advancements in 3D Interactive Devices for Virtual Environments, The Eurographics Association 2003, p. 47-56.*

(Continued)

*Primary Examiner*—Ting Lee
*Assistant Examiner*—Ashraf Zahr
(74) *Attorney, Agent, or Firm*—Michael J. Buchenhorner; Derek S. Jennings

(57) ABSTRACT

A communication device which urges a user to select another communication device with which communication should be performed in a plurality of communication devices existing as candidates for communication, and which performs communication with the selected communication device. The communication device has an acquisition section which obtains, from each of the plurality of communication devices, motion information indicating the motion of the communication device in space, a display section which displays each of motion images representing the motions of the plurality of communication devices in space on the basis of the motion information obtained from the communication devices, and a communication section which urges the user to select one of the motion images displayed by the display section, and which performs communication with the communication device indicated by the selected motion image.

35 Claims, 8 Drawing Sheets

U.S. PATENT DOCUMENTS

| | | | |
|---|---|---|---|
| 6,545,601 B1 * | 4/2003 | Monroe | 340/521 |
| 6,930,730 B2 * | 8/2005 | Maxon et al. | 348/734 |
| 7,030,856 B2 * | 4/2006 | Dawson et al. | 345/158 |
| 7,233,316 B2 * | 6/2007 | Smith et al. | 345/157 |
| 2001/0032236 A1 * | 10/2001 | Lin | 709/203 |
| 2003/0011467 A1 * | 1/2003 | Suomela | 340/7.1 |
| 2003/0210283 A1 * | 11/2003 | Ishii et al. | 345/848 |

FOREIGN PATENT DOCUMENTS

JP    PUPA 2002-3545-22    12/2002

OTHER PUBLICATIONS

Ken Hinckley, Mike Sinclair, Erik Hanson, Richard Szeliski, Matt Conway, The VideoMouse: A Camera-Based Multi-Degree-of-Freedom Input Device, 1999, ACM, UIST 99, pp. 103-112.*

Eric Woods, Paul Mason, Mark Billinghurst, MagicMouse: an Inexpensive 6-Degree-of-Freedom Mouse, © 2003 ACM 1-58113-578-5/03/0002, pp. 285-286.*

Haruo et al. Japanese Publication No. 2003-032176 published on Jan. 31, 2003.

Shigeyuki. Japanese Publication No. 2002-325061 published on Nov. 8, 2002.

* cited by examiner

[Figure 1]
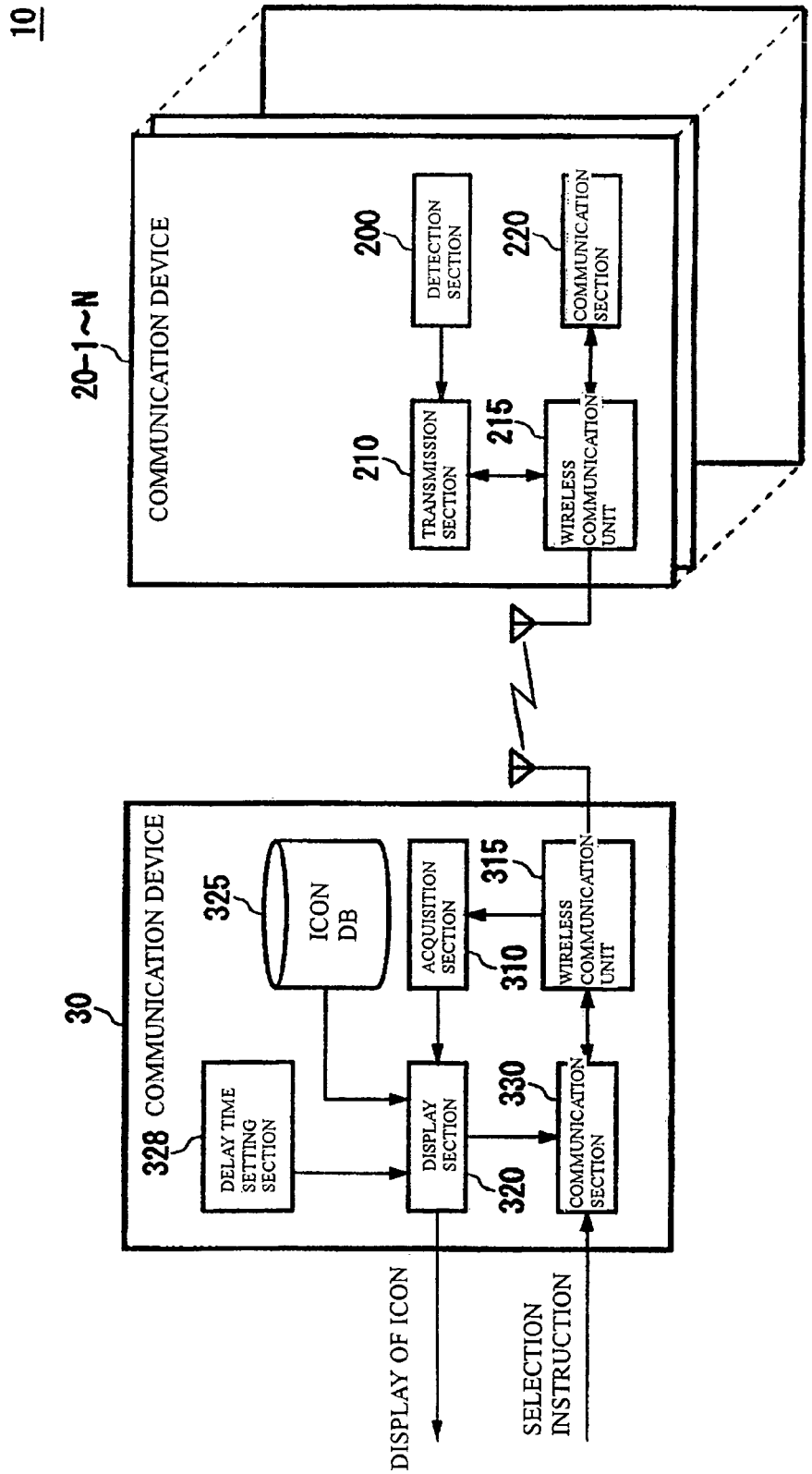

[Figure 2]
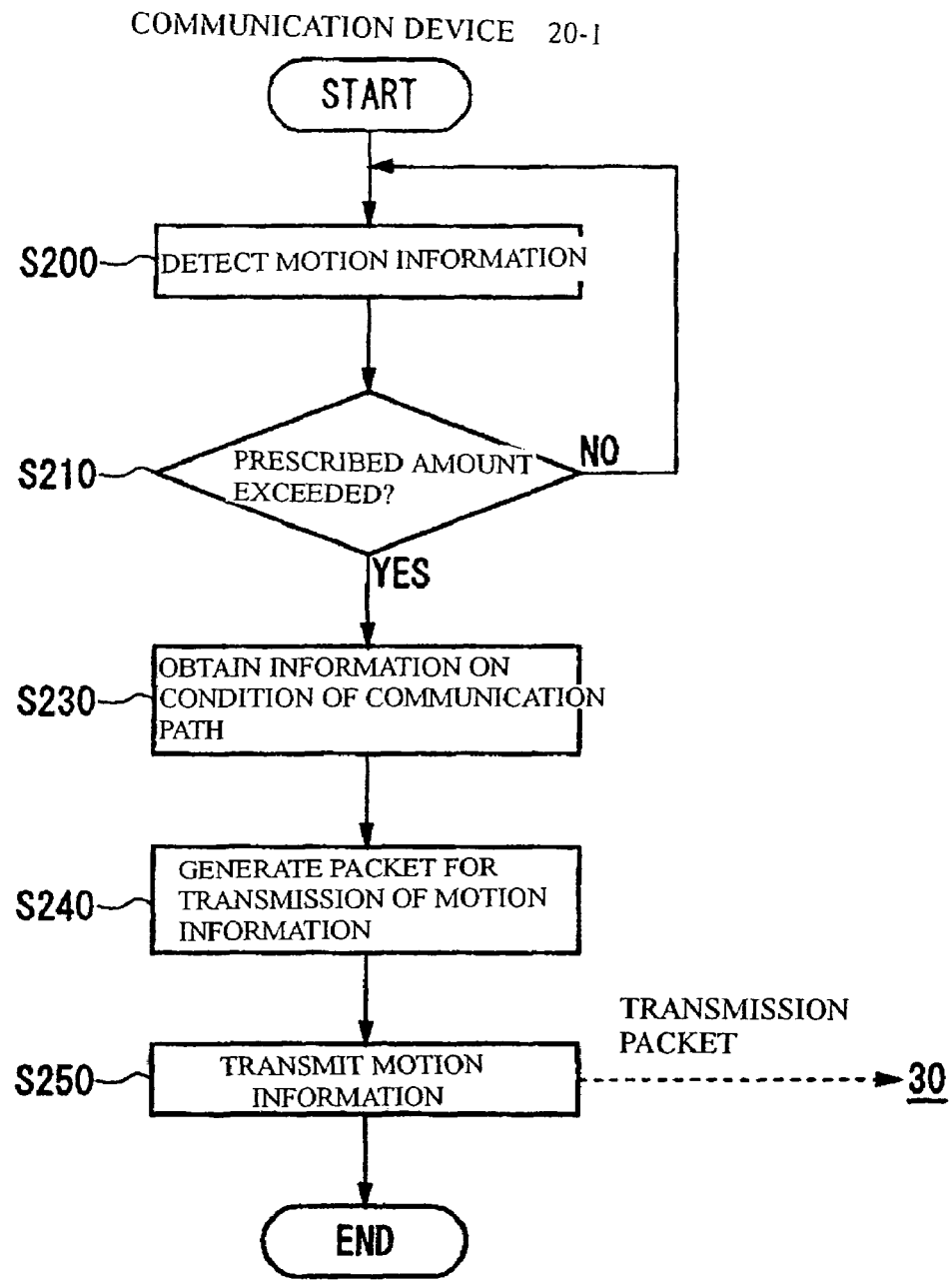

[Figure 3]
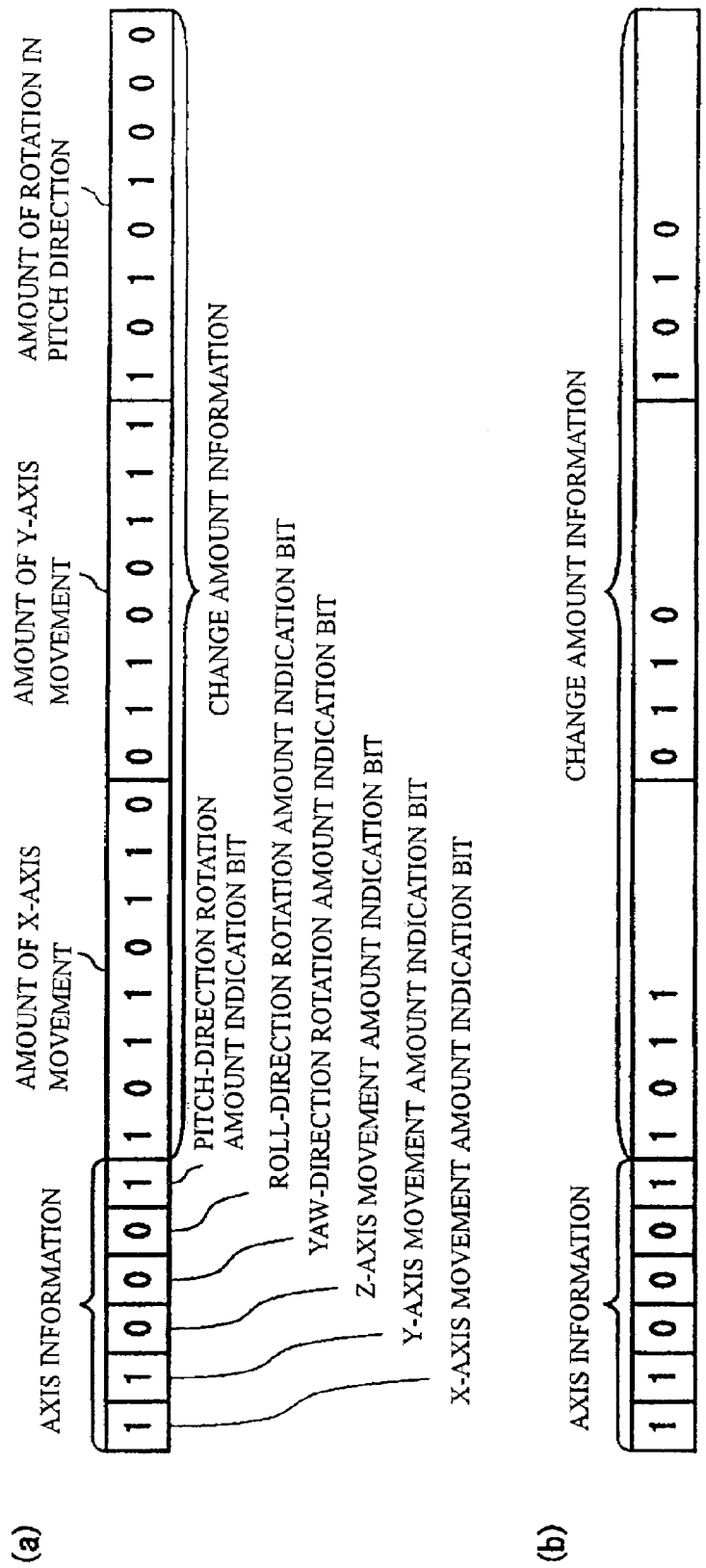

[Figure 4]
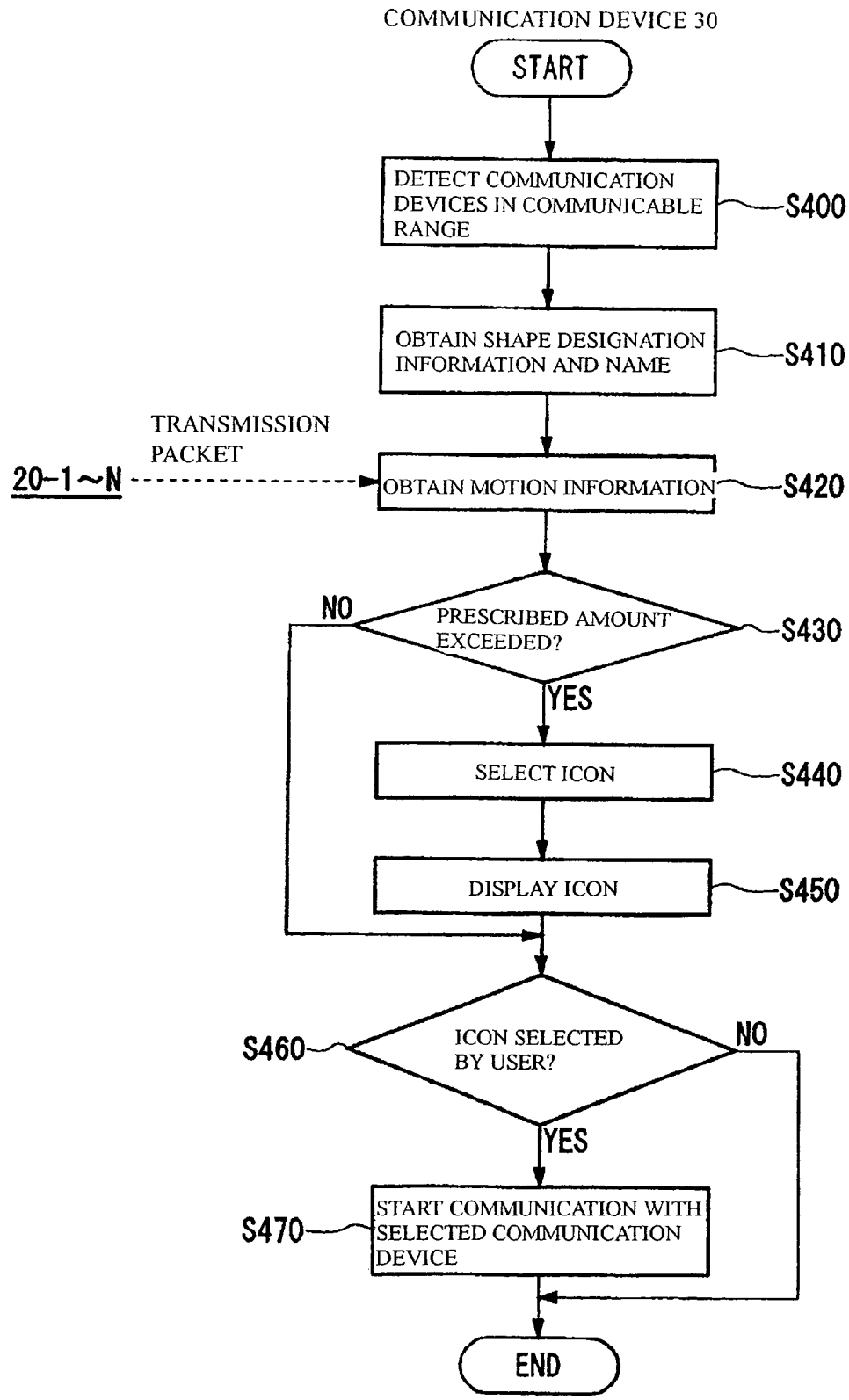

[Figure 5]
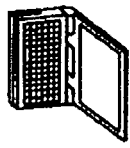

[Figure 6]
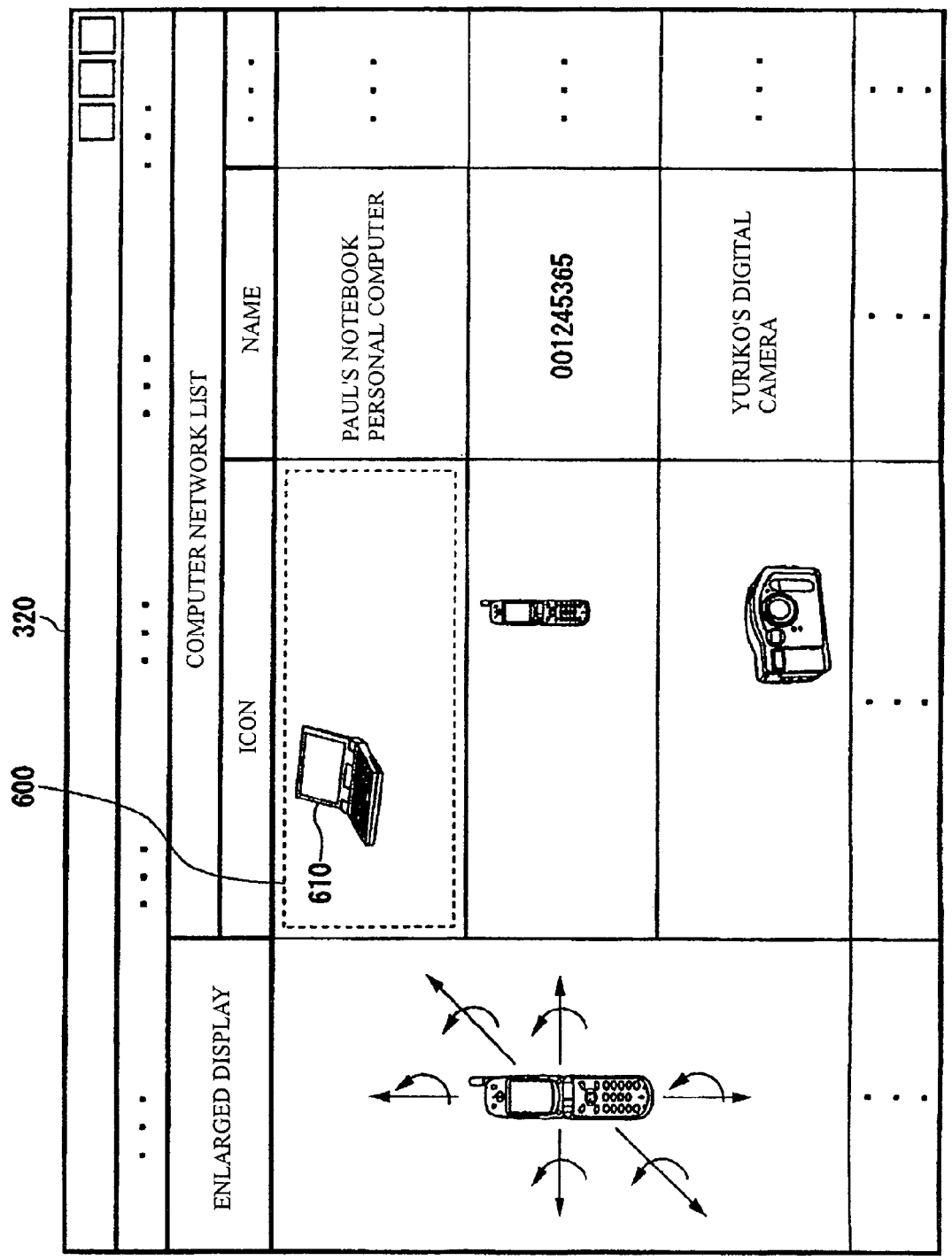

[Figure 7]

| \ | 320 | | |
|---|---|---|---|
| ... | ... | ... | ... ... |
| LIST OF FILES IN PAUL'S NOTEBOOK PERSONAL COMPUTER | | | |
| FILE NAME | DATE OF MAKING | SIZE | ... |
| ABC.txt | December, 1, 2003 | 53KB | ... |
| CDE.txt | December, 2, 2003 | 2KB | ... |
| ⋮ | ⋮ | ⋮ | |

[Figure 8]
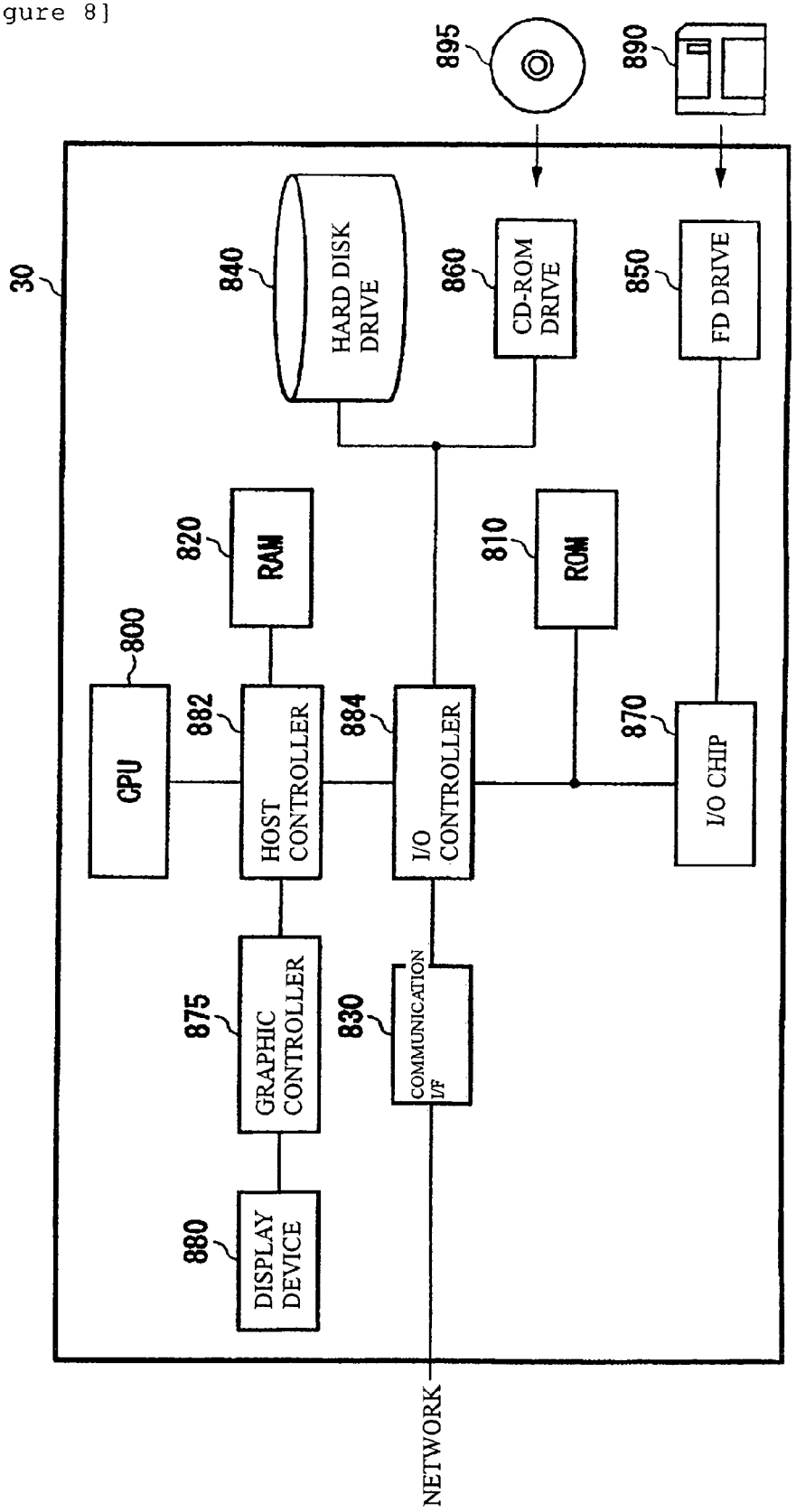

COMMUNICATION DEVICE, COMMUNICATION SYSTEM, COMMUNICATION METHOD, PROGRAM AND RECORDING MEDIUM

FIELD OF THE INVENTION

The present invention relates to a communication device, a communication system, a communication method, a program and a recording medium. More particularly, the present invention relates to a communication device, a communication system, a communication method, a program and a recording medium for communication with another communication device selected by a user.

DESCRIPTION OF RELATED ART

In recent years, with the widespread use of portable information communication terminals, wireless data communication has been widely performed. Everyone can now easily perform data communication with others. In some cases where a plurality of candidates for communication with a person exist, it is difficult for the person to suitably determine, on his/her information communication terminal, one of information communication terminals with which he or she wishes to perform communication.

Conventionally, an information communication terminal is arranged to enable a user to input information for identification of another information communication terminal with which communication should be performed, e.g., a name of the information communication terminal, an IP address or a telephone number, in order to determine the information communication terminal with which communication should be performed among a multiplicity of information communication terminals. As a technique for facilitating determination of a communication terminal, a technique of displaying icons for a plurality of terminals existing as candidates for communication to enable a user to make selection from the candidates has also been used. Further, a technique of determining a terminal with which communication should be performed on the basis of the results of image pickup of communication devices from which selection should be made for communication (see patent document 1) and a technique of determining a communication terminal with which communication should be performed by using a noncontact IC card (see patent document 2) have been proposed.

[Patent Document 1]
Published Unexamined Patent Application No. 2002-325061

[Patent Document 2]
Published Unexamined Patent Application No. 2003-32176

However, a multiplicity of information communication terminals which can be candidates for communication exist in a conference in which a number of persons carrying information communication terminals participate, a downtown, or the like where there are various and many people. In such a situation, it is usually difficult to suitably determine a terminal with which communication should be performed. For example, in a situation where a person wants to transmit his/her own data to an information communication terminal of another person with whom he or she happened to become acquainted in a conference, it is troublesome for him/her to determine the information communication terminal to which the data should be sent since a number of other information communication terminals exist in the place for conference.

More specifically, when a person is given information for identification of an information communication terminal with which he or she wishes to perform communication and which is owned by the another person, it is necessary for him/her to perform an operation for correctly inputting the identification information. Also, a need may arises to perform an operation for selecting the desired one of a number of displayed identification information items. Such an operation is troublesome. Also, with the widespread proliferation of information communication terminals, it has become difficult for users to give names to information communication terminals and remember the names. In many cases, manufacturer's serial numbers or the like are used as information for identification of terminals just as they are. In such cases, it is more difficult to ensure accurate communication of identification information to a user of a communication terminal with which communication should be performed.

In the device described in patent document 1, images of communication devices each probable to be selected as a terminal with which communication will be performed are stored in advance in a state of being related to information for identification of the communication devices, and an image of a communication device with which there is a need for communication is obtained and compared with the stored imaged by being recognized by an image recognition technique or the like to determine the information for identification of the communication device. This technique eliminates the need for a troublesome operation such as an key input operation but requires that the distance to the other end of the communication channel, the environment, etc., be suitable for image pickup.

According to patent document 2, a Bluetooth device with which a person wishes to perform communication has an IC card on which a Bluetooth address of the device is recorded. Reading the Bluetooth address from the IC card suffices for enabling communication with the device. It is not necessary to input an ID or the like of the device. According to this technique, however, it is necessary to bring the communication device of the person close enough to read the IC card of the device with which communication is to be performed.

SUMMARY OF THE INVENTION

An object of the present invention is to provide a communication device, a communication system, a communication method and a recording medium capable of solving the above-described problems. This object can be attained by a combination of features described in the independent claims in the appended claims. In the dependent claims, further advantageous examples of the present invention are specified.

To achieve the above-described object, according to a first aspect of the present invention, there is provided a communication device which urges a user to select another communication device with which communication should be performed in a plurality of communication devices existing as candidates for communication, and which performs communication with the selected communication device, the device having an acquisition section which obtains, from each of the plurality of communication devices, motion information indicating the motion of the communication device in space, a display section which displays each of motion images representing the motions of the plurality of communication devices in space on the basis of the motion information obtained from the communication devices, and a communication section which urges the user to select one of the motion images displayed by the display section, and which performs communication with the communication device indicated by the selected motion image, a communication system, a communication method using the communication device, a program for implementation of the communication device, and a recording medium on which the program is recorded.

According to a second aspect of the present invention, there is provided a communication device used in the field of view of a user of another communication device, having a transmission section which transmits motion information indicating the motion of the communication device in space to the another communication device to enable a motion image representing the motion of the communication device in space to be displayed by a display section of the another communication device, and a communication section which communicates with the another communication device when the user of the another communication device selects the communication device as a terminal with which communication should be performed, on the basis of the motion image displayed by the display section of the another communication device and the result of visual recognition of the motion of the communication device, a communication system, a communication method using the communication device, a program for implementation of the communication device, and a recording medium on which the program is recorded.

In the summary of the present invention, not all the necessary features of the invention are listed. Subcombinations of the features can also constitute the present invention.

BRIEF DESCRIPTION OF THE DRAWINGS

FIG. 1 shows functional blocks of communication system 10.

FIG. 2 shows processing performed by communication device 20-1 to transmit motion information.

FIG. 3 shows an example of motion information transmitted by communication device 20-1.

FIG. 4 shows processing in communication device 30 when communication device 30 selects one of the communication devices with which communication should be performed according to an instruction from the user.

FIG. 5 shows an example of the data structure of icon DB 325.

FIG. 6 shows an example of a display produced by display section 320.

FIG. 7 shows an example of display in a case where an icon displayed by display section 320 is selected.

FIG. 8 shows an example of the hardware configuration of communication device 30.

DETAILED DESCRIPTION OF THE INVENTION

The present invention will be described with respect to an embodiment thereof. The embodiment described below, however, is not limiting of the invention set forth in the appended claims, and all combinations of features described in the description of the embodiment are not necessarily indispensable to the solving means according to the present invention.

FIG. 1 is a functional block diagram of a communication system 10. The communication system 10 has communication devices 20-1 to 20-N each of which is an example of the first communication device in accordance with the present invention, and a communication device 30 which is an example of the second communication device in accordance with the present invention. Each of the communication devices 20-1 to 20-N is a portable communication terminal, e.g., a notebook personal computer, a portable telephone, a digital camera, a PDA, a Bluetooth device or the like. Each of the communication devices 20-1 to 20-N performs wireless communication with the communication device 30. More specifically, each of the communication devices 20-1 to 20-N wirelessly communicates with the communication device 30 through a wireless LAN in accordance with a standard such as IEEE 802.11a/b/g, communication in accordance with the Bluetooth standard, or a public portable telephone network (PSTN). The communication system 10 is arranged to enable a user of the communication device 30 to easily and speedily select one of the communication devices 20-1 to 20-N with which the user wishes to perform communication.

More specifically, each of the communication devices 20-1 to 20-N is used in the field of view of the user of the communication device 30, and transmits to the communication device 30 motion information indicting a motion of the communication device 20-1 to 20-N in space. The communication device 30 displays to the user each of motion images indicating the motions in space of the communication devices 20-1 to 20-N existing as candidates for communication. The user of the communication device 30 compares each of the displayed motion images of the communication devices 20-1 to 20-N with the motion of the corresponding one of the communication devices 20-1 to 20-N actually recognized visually, thereby determines the communication device with which the user wishes to perform communication, and starts communication. Thus, the communication system 10 enables a user to easily and speedily determine one of a plurality of communication devices with which the user wishes to perform communication.

The communication device 20-1 has a detection section 200, a transmission section 210, a wireless communication unit 215, and a communication section 220. Each of the communication devices 20-2 to 20-N has substantially the same configuration as that of the communication device 20-1, and the same description for the configuration of the communication devices 20-2 to 20-N will not be repeated. The detection section 200 detects motion information indicating the motion of the communication device 20-1 in space. For example, the detection section 200 has an acceleration sensor for measuring the acceleration when the communication device 20-1 moves or rotates in space, and periodically sends measurement results to the transmission section 210. The detection section 200 also has, for example, an IC chip for acceleration measurement and a gyroscope, an earth magnetism sensor, a camera or the like. For example, the detection section 200 may detects the orientation of the communication device 20-1 on the basis of the result of imaging of surroundings with the camera. Alternatively, the detection section 200 may have a GPS device and thereby detect the motion of the communication device 20-1 in space. The detection section 200 may be an externally attached device provided separately from the communication device 20-1.

The transmission section 210 transmits the motion information detected by the detection section 200 to the communication device 30 by using the wireless communication unit 215. If the motion information is information on the acceleration, transmission section 210 may perform processing for converting data on the acceleration data into data on the amount of movement and thereafter transmit the converted data on the amount of movement as motion information to the communication device 30 or may directly transmit data on the acceleration as motion information. The communication section 220 performs communication with the communication device 30 by using the wireless communication unit 215 when the user of the communication device 30 selects, as a device with which communication should be performed, the communication device 20-1 on the basis of the motion image displayed on a display section 320 of the communication device 30 and the result of visual recognition of the motion of the communication device 20-1. Preferably, at this time, the communication section 220 adjusts the communication rate, for example, according to network traffic between the communication device 30 and the communication device 20-1, or the condition of ratio waves.

The communication device 30 has an acquisition section 310, a wireless communication unit 315, the display section 320, an icon DB 325, a delay time setting section 328, and a communication section 330. The acquisition section 310 obtains from each of the communication devices 20-1 to 20-N motion information indicating the motion of the communication device in space by using the wireless communication unit 315. For example, the acquisition section 310 obtains as motion information the amount of movement of the communication device in space, the amount of rotation of the communication device in space or the acceleration accompanying the movement or rotation of the communication device in space. Alternatively, motion information may be the period or amplitude of vibration of the communication device when the communication device is shaken by the user.

The display section 320 displays a motion image indicating the motion of each of the communication devices 20-1 to 20-N on the basis of motion information obtained from the communication device. For example, the icon DB 325 stores a plurality of icons including images obtained by imaging the communication devices 20-1 to 20-N in various directions, and the display section 320 selects the icon representing one of the communication devices 20-1 to 20-N according to motion information obtained from the communication devices 20-1 to 20-N existing as candidates for communication and displays the selected icon as a motion image. For example, the display section 320 may select and display a motion image indicating the same motion as that one of the communication devices 20-1 to 20-N actually has.

The display section 320 may display a motion image indicating a change in the orientation of each of the communication devices 20-1 to 20-N relative to the orientation of the communication device 30. In such a case, the display section 320 has a means for detecting a change in the orientation of the communication device 30 itself, e.g., an earth magnetism sensor. The display section 320 computes a change in the orientation of each of the communication devices 20-1 to 20-N relative to the orientation of the communication device 30 by adding to the motion information obtained by the acquisition section 310 information on a change in the orientation of the communication device 30 itself detected with the earth magnetism sensor. The display section 320 may select and display the icon on the basis of the computed change in orientation. In this case, the icon is changed not only when the orientation of one of the communication devices 20-1 to 20-N is changed but also when the orientation of the communication device 30 is changed. In this manner, the icon displayed by the display section 320 can be approximated to the motion of the corresponding one of the communication devices 20-1 to 20-N as actually seen by the user.

The delay time setting section 328 sets, according to an instruction from the user for example, a delay time by which the time at which the display section 320 displays a motion image relative to the time at which the acquisition section 310 obtains motion information. The display section 320 may display a motion image after a lapse of this delay time from the time at which motion information is obtained by the acquisition section 310. The user of the communication device 30 is thereby enabled to suitably compare the motion of the communication device 20-1 itself and the motion of the icon even in a case where it is difficult to simultaneously observe the communication device 20-1 itself and the icon displayed on the screen of the communication device 30. Subsequently, the communication section 330 urges the user to select one of the icons displayed by the display section 320 and, by using the wireless communication unit 315, communicates with the communication device indicated by the selected icon.

In the communication device 30, each of processing performed by the acquisition section 310 to obtain a motion image and processing performed by the communication section 330 to communicate with the communication device 20-1 actually comprises communication using a wireless LAN or the like. In this embodiment, for convenience's sake, processing performed by the communication section 330 to perform transmission of data to the communication section 220 or reception of data from the communication section 220 is referred to as "communication" while processing performed by the transmission section 210 and the acquisition section 310 is referred to not as "communication" but as "transmission and acquisition of motion information."

FIG. 2 shows processing performed by the communication device 20-1 to transmit motion information. The communication device 20-1 periodically repeats processing described below, for example, according to a setting made by the user. The detection section 200 detects motion information indicating the motion of the communication device 20-1 in space (S200). If the amount of movement or rotation per unit time indicated by the detected motion information does not exceed a predetermined prescribed amount (S210: NO), the detection section 200 returns the process to S200.

If the amount of movement or rotation per unit time indicated by the detected motion information exceeds the predetermined prescribed amount (S210: YES), the transmissions section 210 obtains from the wireless communication unit 215 or the like condition information indicating the condition of communication over a communication channel between the communication device 20-1 and the communication device 30, e.g., network traffic or the condition of radio waves (S230). Subsequently, the transmission section 210 generates a transmission packet for transmitting the motion information on the basis of the motion information detected by the detection section 200 and the obtained condition information (S240).

For example, if the communicable amount of data indicated by the information on the condition of the communication channel is smaller, the transmission section 210 generates a transmission packet of a smaller data size in comparison with a case where the communicable amount of data is larger. The transmission section 210 transmits the generated transmission packet as motion information to the communication device 30, thereby enabling the icon indicating the motion of the communication device 20-1 in space to be displayed by the display section 320 of the communication device 30 (S250). Alternatively, the transmission section 210 may adjust the frequency of transmission of the transmission packet on the basis of the obtained condition information.

FIG. 3 shows an example of motion information transmitted by the communication device 20-1. The motion information shown in this figure indicates movements in 6-axis directions in which the communication device 20-1 moves or rotates in three-dimensional space. More specifically, the transmission section 210 transmits the motion information as a combination of axis information indicating the directions of movements and the change amount information indicating the amounts of movement in the directions indicated by the axis information.

As shown in FIG. 3(a), the axis information indicates the directions of movements indicated by the motion information. More specifically, the axis information is formed of six bits corresponding to the amount of movement in the X-axis direction, the amount of movement in the Y-axis direction, the amount of movement in the Z-axis direction, the amount of rotation in the yaw direction (e.g., the amount of rotation about the Z-axis), the amount of rotation in the roll direction (e.g., the amount of rotation about the X-axis), and the amount of rotation in the pitch direction (e.g., the amount of rotation about the Y-axis). The motion information includes as change amount information the amount of movement or the amount of rotation in the direction indicated by a corresponding bit "1" in the axis information.

In the axis information shown in the figure, each of the X-axis movement amount indication bit indicating the amount of movement in the X-axis direction, the Y-axis movement amount indication bit indicating the amount of movement in the Y-axis direction and the pitch direction rotation amount indication bit indicating the amount of rotation in the pitch direction is 1, while each of the other bits is 0. Accordingly, the change amount information includes the amount of movement in the X-axis direction, the amount of movement in the Y-axis direction and the amount of rotation in the pitch direction. Thus, the transmission section 210 sets only part of the bits in the axis direction at 1 to transmit information on a movement in a predetermined direction in movements in the 6-axis directions as motion information. It is not necessary for the transmission section 210 to transmit information indicating movements in the other directions.

For example, if the communication device 30 informs the communication device 20-1 in advance that the degrees of freedom of movement of the motion image that the communication device 30 can display are the amount of movement in the X-axis direction, the amount of movement in the Y-axis direction and the amount of rotation in the pitch direction, the communication device 20-1 transmits only information on the amounts of movement and the amount of rotation in these directions to the communication device 30 and does not transmit information on the amount rotation and so on in the other directions. Thus, the communication device 30 sets information necessary for display of the motion image in the communication device 20-1 to enable network traffic to be reduced while ensuring transmission of only necessary information.

In a case where the communication device 20-1 does not have the function of detecting motion information, or in some other case, the transmission section 210 may set each of the bits in axis information is set to 0, that is, may operate so as not to transmit any change amount information. In such a case, even if devices transmitting motion information and devices transmitting no motion information exit mixedly in the communication devices 20-1 to 20-N, the communication device 30 can obtain motion information in a common data structure. As a result, the processing can be simplified without being modified with respect to each of communication devices existing as candidates for communication.

FIG. 3(b) shows another example of the motion information transmitted by the transmission section 210. The change amount information shown in this figure includes groups of four bits each representing the amount of movement or rotation. In comparison with the change amount information including the 8-bit movement amount or rotation amount as shown in FIG. 3(a), the change amount information shown in this figure has a smaller data size. The transmission section 210 may reduce the number of bits in the change amount information according to the information on the condition of the communication channel obtained from the wireless communication unit 215 to reduce the amount of transmitted data, as described above.

Also, the transmission section 210 may transmit an image of the external appearance of the communication device 20-1 itself as motion information instead of the information in the above-described examples. In such a case, for example, the transmission section 210 stores data representing the three-dimensional shape of the communication device 20-1 in advance. The detection section 200 detects the motion of the communication device 20-1 in space, and the transmission section 210 generates an image of the communication device 20-1 seen at a predetermined angle on the basis of the detected motion and the stored data on the three-dimensional shape. The transmission section 210 transmits the generated image to the communication device 20-1. In this case, the display section 320 may immediately display the image obtained as motion information or may display another image on the basis of the image obtained as motion information.

FIG. 4 shows processing in the communication device 30 when the communication device 30 selects one of the communication devices with which communication should be performed according to an instruction from the user. In a case where the user makes such a setting that the communication function can be performed, for example, in a case where the communication device 30 is set in the ad hoc mode of a wireless LAN, the communication device 30 periodically performs the processing shown in the figure. First, the communication device 30 detects the communication devices 20-1 to 20-N as communication devices in the communicable range (S400).

Subsequently, the acquisition section 310 obtains, from each of the communication devices 20-1 to 20-N, shape designation information indicating the shape of the communication device and the name of the communication device (S410). The shape designation information obtained from each of the communication devices 20-1 to 20-N is, for example, information indicating that the communication device has the shape of a notebook personal computer, the shape of a portable telephone or the shape of a digital camera. The shape designation information may be information indicating the kind of the communication device.

Further, the acquisition section 310 obtains, from each of the communication devices 20-1 to 20-N, information on the motion of the communication device (S420). If the amount of movement or the amount of rotation of the communication device indicated by the motion information exceeds a predetermined prescribed amount (S430: YES), the display section 320 selects the icon representing the communication device in the plurality of predetermined icons stored in the icon DB 325 according to the shape designation information and motion information obtained from the communication devices 20-1 to 20-N existing as candidates for communication (S440).

The display section 320 displays the selected icon to the user (S450). The display section 320 may further display the name of the communication device by relating it to the icon. Subsequently, the communication section 330 urges the user to select one of the icons displayed by the display section 320. When one of the icons is selected by the user (S460: YES), the communication section 330 starts communication with the communication device designated by the selected icon (S470). If none of the icons is selected by the user (S460: NO), the communication device 30 terminates the process.

The processing shown in FIGS. 2 and 4 is only an example and a mode of implementation is possible in which some part of the steps shown in the figures is not performed. For example, if the communication device 20-1 determines whether or not the motion information exceeds the prescribed amount in S201 in FIG. 2, the determination made in the communication device 30 as to whether or not the motion information has exceeded the prescribed amount as shown in S430 in FIG. 4 may be omitted. In the case where both S210 and S430 are performed, it is preferred that the prescribed amount in S430 be larger than the prescribed amount used for determination in S210.

FIG. 5 shows an example of the data structure of the icon DB 325. In the icon DB 325, a plurality of icons representing external appearances observed in a plurality of directions of the communication devices existing as candidates for communication are stored by being related to the information indicating the shapes of the communication devices. For example, in the icon DB 325, a plurality of icons representing external appearances of a notebook personal computer observed in a plurality of directions are stored by being related to the information indicating the shape of the notebook personal computer. More specifically, the icon DB 325 stores an icon 500 representing an external appearance of the notebook personal computer seen in a direction toward the upper surface and an icon 510 representing an external appearance as seen in a direction toward the lower surface 180-degree changed in a predetermined plane from the direction toward the upper surface.

An example of processing performed by the display section 320 to select and display an icon will be described with reference to this figure. The display section 320 selects from the icon DB 325 a group of icons corresponding to the shape indicated by shape designation information obtained from the communication device 20-1. For example, if the shape designation information designates the shape of the notebook personal computer, the display section 320 selects a group of icons (e.g., four icons shown in the second row) corresponding to the shape of the notebook personal computer shown in this figure. The display section 320 then selects one of the selected group of icons to be displayed on the basis of motion information obtained by the acquisition section 310.

For example, in a case where the motion information obtained from the communication device 20-1 indicates that the orientation of the communication device 20-1 is rotated through 180 degrees about a predetermined axis when the icon 500 representing an external appearance of the communication device 20-1 is being displayed, the display section 320 selects and displays the icon 510 in place of the displayed icon 500. Then, the user of the communication device 30 can select the icon synchronized with the communication device 20-1 by comparing the icon and the actual motion of the communication device 20-1, and can start communication with the communication device 20-1.

The icon DB 325 may store data indicating the three-dimensional shape of the communication device 20-1 instead of the example shown in this figure. In such a case, the display section 320 computes the orientation of the communication device 20-1 to be displayed as an icon on the basis of the motion information obtained from the communication device 20-1. The display section 320 then generates an icon to be displayed as an external appearance of the communication device 20-1 on the basis of the computed orientation and the three-dimensional shape data stored in the icon DB 325. Processing for generating an icon from the three-dimensional shape data and the orientation may be realized by an existing image rendering technique. In this manner, the communication device 30 can display the motion of the communication device 20-1 with higher fidelity to enable the user to easily select a suitable icon.

FIG. 6 shows an example of a display produced by the display section 320. The display section 320 arranges icons representing movements of a plurality of communication devices existing in the communicable range of the communication device 30 while relating the icons to the names or the like of the communication devices, and displays the icons as a computer network list. More specifically, the display section 320 displays an icon 610 of the communication device 20-1 having the shape of a notebook personal computer in an icon display region 600 determined in advance in correspondence with the communication device 20-1. Further, the display section 320 displays a name "Paul's Notebook Personal Computer" set in advance by relating the same to the icon 610 of the communication device 20-1.

The display section 320 changes the displayed position of the icon 610 representing the communication device 20-1 on the basis of motion information obtained from the communication device 20-1 by the acquisition section 310. For example, if the motion information obtained from the communication device 20-1 indicates that the communication device 20-1 vibrates vertically, the display section 320 changes the displayed position of the icon 610 so that the icon 610 vibrates vertically in the icon display region 600. The icon display region 600 is not limited to a planar region. The icon display region 600 may represent a predetermined three-dimensional region. In such a case, the display section 320 can directly display the motion of the communication device 20-1 in three-dimensional space as the motion in the icon display region 600.

Further, if the motion information obtained from the communication device 20-1 indicates such a motion that the icon 610 should be displayed out of the icon display region 600, the display section 320 may scroll the icon display region 600. If the motion information obtained from the communication device 20-1 indicates such a motion that the icon 610 should be displayed out of the icon display region 600 beyond one end the icon display region 600, the display section 320 may display the motion of the icon 610 in such a manner that the icon 610 enters the icon display region 600 from the other end opposite from the one end. In this manner, the icon is prevented from becoming invisible by moving out of the icon display region, thereby displaying the motion of the icon to the user at all times.

Alternatively, or in addition to this, the display section 320 may change the icon 610 representing the communication device 20-1 and the color, shape or size in which the icon 610 is to be displayed. For example, when the amount of movement or the amount of rotation indicated by the motion information exceeds the prescribed amount, the display section 320 may change the color of the icon 610 to red or may make the entire icon display region 600 blink. In this manner, the icon of the communication device having a large amount of movement can be displayed so as to be easily recognizable even in a case where a large number of icons are displayed.

Preferably, the display section 320 displays an icon based on motion information indicating that the amount of movement or the amount of rotation per unit time has exceeded the predetermined prescribed amount with priority over an icon based on motion information indicating that the amount of movement or the amount of rotation per unit time has not exceeded the predetermined prescribed amount. Further, preferably, the display section 320 displays a motion image based on motion information indicating that the amount of movement or the amount of rotation per unit time has exceeded the prescribed amount by considering user's convenience in selecting an icon in such a manner that the motion image is displayed with priority over other motion images during a predetermined time period after the moment at which the amount of movement or the amount of rotation per unit time exceeds the prescribed amount.

For example, in a case where the amount of movement or the amount of rotation per unit time indicated by certain motion information exceeds the prescribed amount, the display section 320 may display an icon based on the motion information without displaying icons based on motion information indicating that the amount of movement or the amount of rotation per unit time does not exceed the prescribed amount. Alternatively, the display section 320 may display a plurality of icons indicating the motions of the communication devices 20-1 to 20-N in a priority order according to the amounts of rotation or the amounts of movement indicated by the motion information. For example, the display section 320 may display the icon of one of the communication devices having a larger amount of rotation or movement in an upper position or a position closer to the left end on the display screen and display the icon of one of the communication devices having a smaller amount of rotation or movement in a lower position nor a position closer to the right end on the display screen.

Further, the display section 320 may produce an enlarged display of some icon for the purpose of making the motion of the icon more easily recognizable. For example, an enlarged display of an icon having the shape of a potable telephone is shown in a left section in the figure. The display section 320 further displays, as motion images, arrows indicating movements in the 6-axis directions as movements and rotation of the communication device 30 in three-dimensional space. The display section 320 changes the icon in the enlarged display on the basis of the obtained motion information, and may produce a blinking display of the arrow indicating the direction of movement indicated by the motion information or may display the arrow in a state of being increased in thickness relative to a normal thickness.

The communication section 330 urges the user to select one of icons displayed in the manner described above by way of example with reference to the figure, and communicates with the communication device represented by the selected icon. For example, selection from the icons is made by clicking one of the icons with a pointing device such as a mouse. Selection from the icons may also include clicking the name of the communication device or the icon display region related to the icon.

FIG. 7 shows an example of display in a case where an icon displayed by the display section 320 is selected. When one of the icons shown in FIG. 6 is selected by the user, the communication section 330 makes the display section 320 display a list of files stored in the communication device represented by the selected icon, e.g., the communication device 20-1 having a name "Paul's Notebook Personal Computer." For example, the communication section 330 makes the display section 320 display file names of files stored in the communication device 20-1, the dates of making of the files, the sizes of the files, etc., in a state of being related to each other. The communication section 330 reads out some of the files selected from the displayed list by the user, or performs writing on the selected file.

Alternatively, or in addition to this, the communication section 330 may perform other various kinds of processing by communicating with the communication device 20-1. For example, the communication section 330 may establish a connection for a chat between the user of the communication device 30 and the user of the communication device 20-1 and may transmit chat character data. Also, the communication section 330 may establish a connection for speech conversation between the user of the communication device 30 and the user of the communication device 20-1 and may transmit and receive speech data.

FIG. 8 shows an example of the hardware configuration of the communication device 30. The communication device 30 has a CPU peripheral section having a CPU 800, a RAM 820, a graphic controller 875 and a display device 880 connected to each other by a host controller 882, an input/output section having a communication interface 830, a hard disk drive 840 and a CD-ROM drive 860 connected to the host controller 882 by an input/output controller 884, and a legacy input/output section having a ROM 810, a flexible disk drive 850 and an input/output chip 870 connected to the input/output controller 884.

The host controller 882 connects the RAM 820, and the CPU 800 and the graphic controller 875, which access the RAM 820 at a high transfer rate. The CPU 800 operates on the basis of programs stored in the ROM 810 and the RAM 820, and controls each component. The graphic controller 875 obtains image data generated by the CPU 800, etc., on a frame buffer provided in the RAM 820, and displays the image data on the display device 880. Alternatively, the graphic controller 875 may contain therein a frame buffer for storing image data generated by the CPU 800, etc.

The input/output controller 884 connects the host controller 882, the communication interface 830, which is an input/output device of a comparatively high speed, the hard disk drive 840 and the CD-ROM drive 860. The communication interface 830 performs communication with external units via a network. The hard disk drive 840 stores programs and data used by the communication device 30. The CD-ROM drive 860 reads a program or data from a CD-ROM 895 and provides the read program or data to the input/output chip 870 via the RAM 820.

To the input/output controller 884 are also connected the ROM 810 and input/output devices of a comparatively low speed, i.e., the flexible disk drive 850 and the input/output chip 870 or the like. The ROM 810 stores a boot program executed by the CPU 800 at the time of startup of the communication device 30, and programs, etc., dependent on the hardware of the communication device 30. The flexible disk drive 850 reads a program or data from a flexible disk 890 and provides the read program or data to the input/output chip 870 via the RAM 820. The input/output chip 870 connects the flexible disk 890 and various input/output devices, for example, through a parallel port, a serial port, a keyboard port, a mouse port, etc.

A program provided to the communication device 30 is provided by a user in a state of being stored on a recording medium, such as the flexible disk 890, the CD-ROM 895, or an IC card. The program is read out from the recording medium, installed in the communication device 30 via the input/output chip 870 and/or the input/output controller 884, and executed in the communication device 30.

A program installed and executed in the communication device 30 includes an acquisition module, a wireless communication module, a display module, a delay time setting module, and a communication module. The program may use the hard disk drive 840 as the icon DB 325. Operations which the modules operate on the communication device 30 to perform are the same as the operations of the corresponding components in the communication device 30 described above with reference to FIGS. 1 to 7. Therefore, description of the operations will not be repeated.

The communication device 30 may execute a program read out from a recording medium by transmitting the program to each of the communication devices 20-1 to 20-N. The program executed by being transmitted to each of the communication devices 20-1 to 20-N includes a detection module, a transmission module, a wireless communication module and a communication module. Operations which the modules operate on each of the communication devices 20-1 to 20-N to perform are the same as the operations of the corresponding components in the communication devices 20-1 to 20-N described above with reference to FIGS. 1 to 7. Therefore, description of the operations will not be repeated.

The above-described program or modules may be stored on an external storage medium. As the recording medium, an optical recording medium such as a DVD or a PD, a magneto-optic recording medium such as an MD, a tape medium, a semiconductor memory such as an IC card, or the like can be used as well the flexible disk 890 and the CD-ROM 895. Also, a storage device such as a hard disk or a RAM provided in a server system connected to a special-purpose communication network or the Internet may be used as the recording medium to provide the program to the communication device 30 via the network.

An example of application of the above-described communication system 10 will be described.

EXAMPLE OF APPLICATION 1

Use of Ad Hoc Network by Means of Notebook Personal Computer

Conventionally, a notebook personal computer provided with an acceleration sensor for the purpose of preventing a fault in a hard disk is used. In this notebook personal computer, when an acceleration higher than a predetermined value is measured, the head of the hard disk is retracted from the magnetic surface of the hard disk to avoid damage to the magnetic surface of the hard disk.

Conventionally, an ad hoc mode is used in which a plurality of personal computers having wireless LAN functions can communicate with each other without using a wireless LAN access point. If the ad hoc mode is used in a case where a plurality of co-workers make a business trip outside a company and where no wireless LAN access point exists, communication can be conveniently performed between notebook personal computers for the co-workers.

The communication system 10 according to this embodiment ensures that in a case where a number of notebook personal computers other than those for co-workers exist on the road, the notebook personal computers for the co-workers can be easily identified. For example, when a co-worker is requested to vertically shake his/her own notebook personal computer, the acceleration sensor can detect the vibration. In this case, only the icon of the co-worker's personal computer in icons of communication devices existing as candidates for communication moves vertically. Conveniently, clicking the icon suffices for starting communication.

In this case, it is not necessary for the user to bring his/her own communication device to a communication device with which communication should be performed, and it is sufficient to place the computer at such a distance from the communication device at the other end of the communication channel that the communication device can be visually recognized. Since visual recognition of the communication device may suffice, the communication device with which communication should be performed can be identified if the communication device can be seen in a video conference or the like, even in a case where the communication device is at a remote distance. In a case where the user of the communication device at the other end of the communication channel is requested to move the communication device, it is not necessarily required that speech be communicable. Making such the request by gesture may suffice. Thus, the range of application of the present invention is wide.

EXAMPLE OF APPLICATION 2

Hospitalized Patient Monitoring System in Hospital

The communication device 20-1 described above in the description of this embodiment is attached to the body of a hospitalized patient and the communication device 30 is placed in a nurse's station or the like in a hospital, thereby enabling the motion of the hospitalized patient to be grasped. Further, the communication device 30 may display the motion of the communication device 20-1 in a human-figure icon to enable the motion of the hospitalized patient, e.g., lying on his/her face, lying on his/her back, being out of bed or walking to be correctly grasped. Since the communication device 20-1 can easily be identified on the communication device 30, there is no need for a troublesome operation such as an ID input operation even when the communication device 20-1 is newly attached to a hospitalized patient. Thus, the present invention is advantageous in terms of convenience.

In the communication system 10 according to this embodiment, if a user requests a person with whom the user wishes to communicate may request the person to shake or rotate his/her communication device, the motion of the communication device is displayed on the screen of the user's communication device. Thus, the communication device with which the user wishes to perform communication can be easily identified on the user's communication device. Further, restrictions on the environment between the communication devices can be reduced in comparison with the conventional technique of obtaining an image of the communication device at the other end of a communication channel or the conventional technique of communicating with an IC chip provided in the communication device at the other end of a communication channel. For example, the system of the present invention can be used even in a dark place not suitable for image pickup or even if the distance between the communication devices is so large that communication through the IC chip cannot be performed.

According to this embodiment, the user of the communication device 30 can correctly identify on a display screen a terminal with which communication should be performed, so that erroneous recognition of a communication terminal can be avoided. For example, if the user of the communication device 20-1 continues shaking the communication device 20-1 during communication between the communication device 30 and the communication device 20-1, the user of the communication device 30 can always confirm that the communication device at the other end of the communication channel is the communication device 20-1. This means that it is difficult for a malicious person to steal data in the communication device 30 in the disguise of the communication device 20-1, thus improve communication security.

The communication device 30 may further has the components of the communication device 20-1. That is, the communication device 30 may transmit information on the motion of the communication device 30 to the communication device 20-1 to display the information to the user of the communication device 20-1 while displaying a motion image representing the motion of the communication device 20-1. In such a case, each of the user of the communication device 30 and the user of the communication device 20-1 can correctly recognize the other user's communication device. That is, each of the user of the communication device 30 and the user of the communication device 20-1 can check on the screen the terminal at the other end of the communication channel as long as each user continues shaking his/her own communication device, for example, during communication between the communication device 30 and the communication device 20-1, thus further improving communication security. Thus, the communication system 10 according to this embodiment can also be used for mutual identification between communicating terminals.

The present invention has been described with respect to the embodiment thereof. The technical scope of the present invention, however, is not limited to the scope described in the above description of the embodiment. It is apparent to those skilled in the art that various changes and modifications can be made in the described embodiment. From the description in the appended claims, it is apparent that forms including such changes or modifications are also included in the technical scope of the present invention.

According to the above-described embodiment, a communication device, a communication system, a communication method, a program and a recording medium shown in items below can be realized.

(Item 1) A communication device having an acquisition section which obtains, from each of plurality of communication devices, motion information indicating the motion of the communication device in space, a display section which displays each of motion images representing the motions of the plurality of communication devices in space on the basis of the motion information obtained from the communication devices, and a communication section which urges the user to select one of the motion images displayed by the display section, and which performs communication with the communication device indicated by the selected motion image.

(Item 2) The communication device as described in Item 1, wherein with respect to each of the plurality of communication devices existing as candidates for communication, the display section changes the displayed position of an icon representing the communication device on the basis of the motion information obtained from the communication device.

(Item 3) The communication device as described in Item 2, wherein with respect to each of the plurality of communication devices existing as candidates for communication, the display section changes, on the basis of the motion information obtained from the communication device, the displayed position of an icon representing the communication device in an icon display region determined in advance in correspondence with the communication device.

(Item 4) The communication device as described in Item 3, wherein with respect to each of the plurality of communication devices existing as candidates for communication, the display section scrolls the icon display region if the motion information obtained from the communication device indicates a motion to be displayed out of the icon display region.

(Item 5) The communication device as described in Item 3, wherein if, with respect to each of the plurality of communication devices existing as candidates for communication, the motion information obtained from the communication device indicates such a motion that the icon representing the communication device should be displayed out of the icon display region beyond one end the icon display region, the display section displays the motion of the icon representing the communication device in such a manner that the icon enters the icon display region from the other end opposite from the one end.

(Item 6) The communication device as described in Item 2, wherein the acquisition section obtains, from each of the plurality of communication devices, the motion information indicating a change in the orientation of the communication device, and wherein the display section displays the motion image indicating the change in the orientation of the corresponding one of plurality of communication devices existing as candidates for communication on the basis of the obtained motion information and the change in the orientation of the communication device with respect to the orientation of the communication device from which selection among the candidates is made.

(Item 7) The communication device as described in Item 1, wherein the display section selects, according to the motion information obtained from each of the plurality of candidate communication devices existing as candidates for communication, an icon representing the communication device in a plurality of predetermined icons, and displays the selected icon as the motion image.

(Item 8) The communication device as described in Item 7, wherein the acquisition section further obtains, from each of the plurality of communication devices existing as candidates for communication, shape designation information indicating the shape of the communication device, and wherein the display section selects, on the basis of the motion information, one of the icons having the shapes indicated by the shape designation information.

(Item 9) The communication device as described in Item 7, wherein the display section displays, as the motion image, icons representing external appearances of the communication devices existing as candidates for communication, and changes each of the icons representing the communication devices to another icon representing an external appearance seen in a direction designated by the motion information, if the motion information from the corresponding one of the plurality of communication devices existing as candidates for communication indicates that the orientation of the communication device has been changed.

(Item 10) The communication device as described in Item 1, wherein the acquisition section obtains, as the motion information, from each of the plurality of communication devices existing as candidates for communication, the acceleration at which the communication device moves or rotates in space, and wherein the display section displays the motion image representing the motion of each of the plurality of communication devices on the basis of the acceleration obtained from the communication device.

(Item 11) The communication device as described in Item 1, wherein the motion information indicates such a motion that the corresponding one of the communication device existing as candidates for communication moves or rotates in space, and wherein the display section displays the motion image based on the motion information indicating that the amount of movement or the amount of rotation per unit time has exceeded a predetermined prescribed amount with priority over the motion image based on the motion information indicating the amount of movement or the amount of rotation per unit time has not exceeded the predetermined prescribed amount.

(Item 12) The communication device as described in Item 11, wherein the display section displays the motion image based on the motion information indicating that the amount of movement or the amount of rotation per unit time has exceeded a predetermined prescribed amount, and does not display the motion image based on the motion information indicating the amount of movement or the amount of rotation per unit time has not exceeded the predetermined prescribed amount.

(Item 13) The communication device as described in Item 11, wherein the display section displays the plurality of motion images based on the plurality of motion information items by arranging the motion images in a priority order according to the amounts of rotation or the amounts of movement indicated by the motion information.

(Item 14) The communication device as described in Item 11, wherein during a predetermined period after the amount of rotation or the amount of movement per unit time indicated by the motion information has exceeded the prescribed amount, the motion image based on the corresponding motion information is displayed with priority over the other motion images.

(Item 15) The communication device as described in Item 1, wherein with respect to each of the plurality of communication devices existing as candidates for communication, the display section displays, on the basis of the motion information obtained from the communication device, the motion image exhibiting movements in 6-axis directions such that the communication device moves or rotates in three-dimensional space.

(Item 16) The communication device as described in Item 1, further comprising a delay time setting section which sets a delay time by which the time at which the display section displays the motion image is delayed relative to the time at which the acquisition section obtains the motion information, wherein the display section displays the motion image on the basis of the motion information after the lapse of the delay time from the time at which the acquisition section obtains the motion information.

(Item 17) The communication device as described in Item 1, wherein the communication section displays to the user a list of files stored in the communication device indicated by the motion image selected by the user, and reads out some of the file selected from the displayed list by the user or performs writing on the selected file.

(Item 18) A communication device used in the field of view of a user of another communication device, having a transmission section which transmits motion information indicating the motion of the communication device in space to the another communication device to enable a motion image representing the motion of the communication device in space to be displayed by a display section of the another communication device, and a communication section which communicates with the another communication device in response to the user's selection of the another communication device of the communication device as a terminal with which communication should be performed, on the basis of the motion image displayed by the display section of the another communication device and the result of visual recognition of the motion of the communication device.

(Item 19) The communication device as described in Item 18, wherein the motion information indicates such a motion that the communication device is moved or rotated in space by a user, and wherein the transmissions section transmits the motion information to the another communication device when the amount of movement or the amount of rotation per unit time of the communication device exceeds a predetermined prescribed amount.

(Item 20) The communication device as described in Item 18, wherein the transmissions section transmits the motion information indicating movements in 6-axis directions such that the communication device moves or rotate in three-dimensional space as a combination of axis information indicating in which direction a movement is produced and change amount information indicating the amount of movement or the amount of rotation in the direction indicated by the axis information.

(Item 21) The communication device as described in Item 20, wherein the transmission section transmits a movement in a predetermined one of the 6-axis directions as the motion information, and does not transmit information on the movements in the other directions.

(Item 22) A communication system comprising a plurality of first communication devices used in the field of view of a user of another communication device, and a second communication device which urges a user to select one of the plurality of first communication devices with which communication should be performed, and which performs communication with the selected communication device, each of the first communication devices having a transmission section which transmits motion information indicating the motion of the first communication device in space to the second communication device to enable a motion image representing the motion of the first communication device in space to be displayed by a display section of the second communication device, and a communication section which communicates with the second communication device when the user of the second communication device selects the first communication device as a terminal with which communication should be performed, on the basis of the motion image displayed by the display section of the second communication device and the result of visual recognition of the motion of the first communication device, the second communication device having an acquisition section which obtains, from each of the plurality of first communication devices, motion information indicating the motion of the first communication device in space, a display section which displays each of motion images representing the motions of the plurality of first communication devices in space on the basis of the motion information obtained from the first communication devices, and a communication section which urges the user to select one of the motion images displayed by the display section, and which performs communication with the first communication device indicated by the selected motion image.

(Item 23) A communication method including an acquisition step of obtaining, from each of plurality of communication devices, motion information indicating the motion of the communication device in space, a display step of displaying each of motion images representing the motions of the plurality of communication devices in space on the basis of the motion information obtained from the communication devices, and a communication step of urging the user to select one of the motion images displayed in the display step, and performing communication with the communication device indicated by the selected motion image.

(Item 24) A program for controlling a communication device, the program enabling the communication device to function as an acquisition section which obtains, from each of plurality of communication devices, motion information indicating the motion of the communication device in space, a display section which displays each of motion images representing the motions of the plurality of communication devices in space on the basis of the motion information obtained from the communication devices, and a communication section which urges the user to select one of the motion images displayed by the display section, and which performs communication with the communication device indicated by the selected motion image.

(Item 25) A recording medium on which the program as described in Item 24 is recorded.

[Advantages of the Invention]

According to the present invention, communication can be performed by suitably identifying a terminal with which communication will be performed at a request.

[Description of Symbols]
10 . . . Communication system
20 . . . Communication device
30 . . . Communication device
200 . . . Detection section
210 . . . Transmission section
215 . . . Wireless communication unit
220 . . . Communication section
310 . . . Acquisition section
315 . . . Wireless communication unit
320 . . . Display section
325 . . . Icon DB
328 . . . Delay time setting section
330 . . . Communication section
500 . . . Icon
510 . . . Icon
600 . . . Icon display region
610 . . . Icon

The invention claimed is:

1. A device comprising:
A) a wireless communication unit;
B) a delay time setting section that sets a delay time;
C) an acquisition section operatively coupled with the wireless communication unit, said acquisition section configured to:
   detect a plurality of candidate communication devices, said candidate communication devices being communication devices within communication range of the device;
   obtain, from each of the plurality of candidate communication devices, motion information, said motion information indicating the motion of said candidate communication devices in three-dimensional space and comprising motion and rotation detected in six degrees of freedom; and
   determine if the motion of any of the plurality of candidate communication devices exceeds a predetermined threshold of movement;
D) a display section operatively coupled with the acquisition section and the delay time setting section, said display section configured to:
   display a plurality of icons representing the plurality of candidate communication devices;
   select the icon representing the candidate communication device whose motion exceeds the predetermined threshold amount; and
   display the motion of the selected candidate communication device by animating the selected icon such that said animation tracks the motion of the selected candidate communication device and such that said selected icon is easily distinguished from the other icons; said motion being displayed in three-dimensional space on the basis of the motion information obtained from said candidate communication device; and
E) a communication section operatively coupled with the display section and the wireless communication unit, said communication section configured to:
   provoke a user to select the selected icon for communication; and
   initiate communication with the communication device indicated by the selected icon.

2. The device of claim 1 further comprising
F) a database operatively coupled with the display section; and
wherein the acquisition section is further configured to obtain identification information from the plurality of communication devices, wherein said identification information comprises a shape designation; and
wherein the display section is further configured to:
   select the representative icon from the database that corresponds to the identification information; and
   display said representative icon according to the shape designation information.

3. The device of claim 2 wherein the display section is further configured to display a name of said representative icon along with said representative icon.

4. The device of claim 2 further comprising G) an earth magnetism sensor for detecting a change in an orientation of the first device.

5. The device of claim 4 wherein the display section is further configured to indicate a change in the orientation of each of the candidate communication devices relative to the orientation of the first device.

6. The device of claim 2 wherein the display section is further configured to change an appearance of the representative icon by changing a color, shape, and size of said representative icon.

7. The device of claim 1 wherein the acquisition section is further configured to obtain the motion information comprising a period and amplitude of vibration of the candidate communication device when said candidate communication device is shaken by a user.

8. The device of claim 1 wherein the display section is further configured to change a displayed position of the selected icon representing the candidate communication device on the basis of the motion information obtained from said candidate communication device.

9. The device of claim 8, wherein the display section is further configured to change, on the basis of the motion information obtained from the candidate communication device, the displayed position of the icon representing the candidate communication device in an icon display region determined in advance in correspondence with the candidate communication device.

10. The device of claim 9 wherein the display section is further configured to scroll the icon display region if the motion information obtained from the candidate communication device indicates a motion to be displayed out of the icon display region.

11. The device of claim 1 wherein if the motion information obtained from the candidate communication device indicates such a motion that the selected icon should be displayed out of the icon display region beyond one end of the icon display region, said display section displays the motion of the selected icon in such a manner that said selected icon enters the icon display region from the other end opposite from said one end.

12. The device of claim 1 wherein said acquisition section further obtains, from each of the plurality of candidate communication devices, shape designation information indicating the shape of the candidate communication device, and wherein said display section selects, on the basis of the motion information, one of the icons having the shape indicated by the shape designation information.

13. The device of claim 12, wherein said display section displays icons representing external appearances of the candidate communication devices, and changes each of the icons representing the candidate communication devices to another icon representing an external appearance seen in a direction designated by the motion information, if the motion information from a corresponding one of the plurality of candidate communication devices indicates that the orientation of the candidate communication device has been changed.

14. The device of claim 1, wherein said acquisition section obtains, as the motion information, from each of the plurality of candidate communication devices, an acceleration at which said candidate communication device moves or rotates in three-dimensional space, and wherein said display section displays the icon representing the motion of each of the plurality of candidate communication devices on the basis of the acceleration obtained from said candidate communication device.

15. The device of claim 1, wherein said display section is further configured to:
    display the selected icon based on the motion information indicating that the amount of rotation per unit of time has exceeded the predetermined prescribed amount, and
    not display an icon based on the motion information indicating that the amount of rotation per unit time has not exceeded the predetermined prescribed amount.

16. The device of claim 15, wherein said display section is further configured to display the icons based on the motion information by arranging the icons in a priority order according to the amounts of rotation or the amounts of movement indicated by the motion information.

17. The device of claim 1, wherein the delay time setting section sets a delay time by which the time at which said display section displays the icons is delayed relative to the time at which said acquisition section obtains the motion information, wherein said display section displays the icons on the basis of the motion information after the lapse of the delay time from the time at which said acquisition section obtains the motion information.

18. A communication method performed by a communication device, the method comprising:
    setting a delay time by which the time at which a display displays a motion image is delayed relative to the time at which an acquisition section obtains the motion information;
    detecting a plurality of candidate communication devices, said candidate communication devices being communication devices within communication range of the device;
    obtaining, from each of the plurality of candidate communication devices, motion information, said motion information indicating the motion of said candidate communication devices in three-dimensional space and comprising motion and rotation detected in six degrees of freedom; and
    determining if the motion of any of the plurality of candidate communication devices exceeds a predetermined threshold of movement;
    displaying a plurality of icons each representing one of the plurality of candidate communication devices;
    selecting the icon representing the candidate communication device whose motion exceeds the predetermined threshold amount;
    displaying motion of the selected candidate communication device by animating the selected icon such that said animation tracks the motion of the selected candidate communication device and such that said selected icon is easily distinguished from the other icons; said motion being displayed in three-dimensional space on the basis of the motion information obtained from said candidate communication device; and
    provoking a user to select the selected icon for communication; and
    initiating communication with a communication device indicated by the selected icon.

19. The method of claim 18 farther comprising:
    obtaining identification information from the plurality of communication devices, wherein said identification information comprises a shape designation;
    selecting the representative icon from the database that corresponds to the identification information; and
    displaying said representative icon according to the shape designation information.

20. The method of claim 19 further comprising displaying a name of said representative icon along with said representative icon.

21. The method of claim 19 further comprising using an earth magnetism sensor for detecting a change in an orientation of the first device.

22. The method of claim 21 further comprising indicating a change in the orientation of each of the candidate communication devices relative to the orientation of the first device.

23. The method of claim 21 further comprising changing an appearance of the representative icon by changing a color, shape, and size of said representative icon.

24. The method of claim 18 further comprising obtaining the motion information comprising a period and amplitude of vibration of the candidate communication device when said candidate communication device is shaken by a user.

25. The method of claim 24 further comprising changing a displayed position of the selected icon representing the candidate communication device on the basis of the motion information obtained from said candidate communication device.

26. The method of claim 18 further comprising changing, on the basis of the motion information obtained from the candidate communication device, the displayed position of the icon representing the candidate communication device in an icon display region determined in advance in correspondence with the candidate communication device.

27. The method of claim 26 further comprising displaying the region if the motion information obtained from the candidate communication device indicates a motion to be displayed out of the icon display region.

28. The method of claim 27 further indicating a motion that the selected icon should be displayed out of the icon display region beyond one end of the icon display region, said display section displays the motion of the selected icon in such a manner that said selected icon enters the icon display region from the other end opposite from said one end.

29. The method of claim 28 further comprising obtaining, from each of the plurality of candidate communication devices, shape designation information indicating the shape of the candidate communication device, and wherein said display section selects, on the basis of the motion information, one of the icons having the shape indicated by the shape designation information.

30. The method of claim 29 further comprising displaying icons representing external appearances of the candidate communication devices, and changes each of the icons representing the candidate communication devices to another icon representing an external appearance seen in a direction designated by the motion information, if the motion information from a corresponding one of the plurality of candidate communication devices indicates that the orientation of the candidate communication device has been changed.

31. The method of claim 30 further comprising obtaining, as the motion information, from each of the plurality of candidate communication devices, an acceleration at which said candidate communication device moves or rotates in three-dimensional space, and wherein said display section displays the icon representing the motion of each of the plurality of candidate communication devices on the basis of the acceleration obtained from said candidate communication device.

32. The method of claim 31 further comprising:
displaying the selected icon based on the motion information indicating that the amount of rotation per unit of time has exceeded the predetermined prescribed amount, and
not displaying an icon based on the motion information indicating that the amount of rotation per unit time has not exceeded the predetermined prescribed amount.

33. The method of claim 32 further comprising displaying the icons based on the motion information by arranging the icons in a priority order according to the amounts of rotation or the amounts of movement indicated by the motion information.

34. The method of claim 33 further comprising setting a delay time by which the time at which said display section displays the icons is delayed relative to the time at which said acquisition section obtains the motion information, wherein said display section displays the icons on the basis of the motion information after the lapse of the delay time from the time at which said acquisition section obtains the motion information.

35. A computer readable storage medium comprising instructions that cause the computer to execute a method comprising:
setting a delay time by which the time at which said display section displays the motion image is delayed relative to the time at which said acquisition section obtains the motion information;
detecting a plurality of candidate communication devices, said candidate communication devices being communication devices within communication range of the device;
obtaining, from each of the plurality of candidate communication devices, motion information, said motion information indicating the motion of said candidate communication devices in three-dimensional space and comprising motion and rotation detected in six degrees of freedom; and
determining if the motion of any of the plurality of candidate communication devices exceeds a predetermined threshold of movement;
displaying a plurality of icons each representing one of the plurality of candidate communication devices;
selecting the icon representing the candidate communication device whose motion exceeds the predetermined threshold amount;
displaying the motion of the selected candidate communication device by animating the selected icon such that said animation tracks the motion of the selected candidate communication device and such that said selected icon is easily distinguished from the other icons; said motion being displayed in three-dimensional space on the basis of the motion information obtained from said candidate communication device; and
provoking a user to select the selected icon for communication; and
initiating communication with a communication device indicated by the selected icon.

* * * * *